United States Patent
Rofougaran (10) Patent No.: US 8,311,496 B2
(45) Date of Patent: *Nov. 13, 2012

(54) TRANSMITTER WITH DIGITAL UP CONVERSION AND MULTIMODE POWER AMPLIFIER

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 11/710,823

(22) Filed: Feb. 26, 2007

(65) Prior Publication Data

US 2008/0205359 A1 Aug. 28, 2008

(51) Int. Cl.
*H04B 1/04* (2006.01)

(52) U.S. Cl. ..................................... 455/118; 455/127.1

(58) Field of Classification Search ............. 455/91–129
See application file for complete search history.

(56) References Cited

U.S. PATENT DOCUMENTS

| | | | | |
|---|---|---|---|---|
| 6,845,083 B2 * | 1/2005 | Mollenkopf et al. | ......... | 370/215 |
| 7,826,554 B2 * | 11/2010 | Haque et al. | .................. | 375/297 |
| 7,848,451 B2 * | 12/2010 | Cai et al. | ...................... | 455/63.1 |
| 7,945,229 B2 * | 5/2011 | Wilson et al. | .............. | 455/127.1 |
| 2002/0094791 A1 * | 7/2002 | Pehlke et al. | .................. | 455/115 |
| 2003/0073418 A1 * | 4/2003 | Dening et al. | ................ | 455/126 |
| 2005/0130609 A1 * | 6/2005 | Nagode et al. | ................ | 455/126 |
| 2007/0184793 A1 * | 8/2007 | Drogi et al. | ................ | 455/127.1 |
| 2007/0249388 A1 * | 10/2007 | Sorrells et al. | ............. | 455/552.1 |

* cited by examiner

*Primary Examiner* — Lana N Le
(74) *Attorney, Agent, or Firm* — Garlick & Markison; Bruce E. Stuckman (57) ABSTRACT

A voice, data and RF integrated circuit (IC) includes a transmitter processing module, coupled to receive outbound data and to produce processed data in accordance with a selected one of a plurality of protocols and that generates a control signal based on the selected on of the plurality of protocols. A digital up conversion module produces a digital up-converted signal from the processed data. A radio receiver front end includes a programmable power amplifier that produces a transmit signal from the digital up-converted signal in accordance with the selected one of the plurality of protocols, based on the control signal.

19 Claims, 10 Drawing Sheets

TRANSMITTER WITH DIGITAL UP CONVERSION AND MULTIMODE POWER AMPLIFIER

CROSS-REFERENCE TO RELATED APPLICATIONS

The present application is related to the following U.S. patent application:
MULTIMODE TRANSMITTER WITH DIGITAL UP CONVERSION AND METHODS FOR USE THEREWITH having application Ser. No. 11/710,766,
that is commonly assigned and concurrently filed herewith, the contents of which are incorporated herein by reference thereto.

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

A need exists for transceivers to operate efficiently in accordance with multiple protocols. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
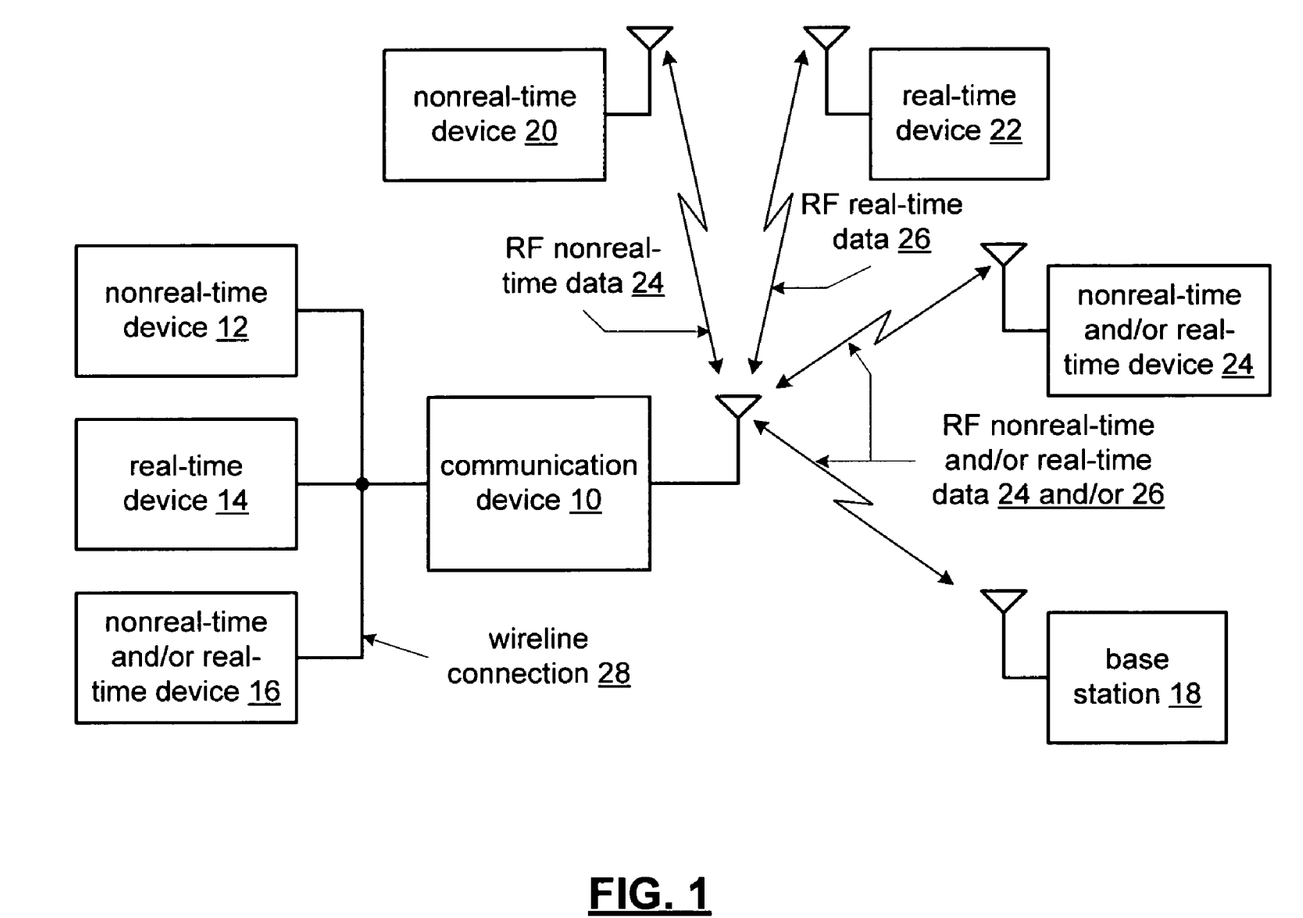
FIG. 1 is a schematic block diagram of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), third or fourth generation wireless protocol (3G or 4G) or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-11 that follow.

Figure 2:
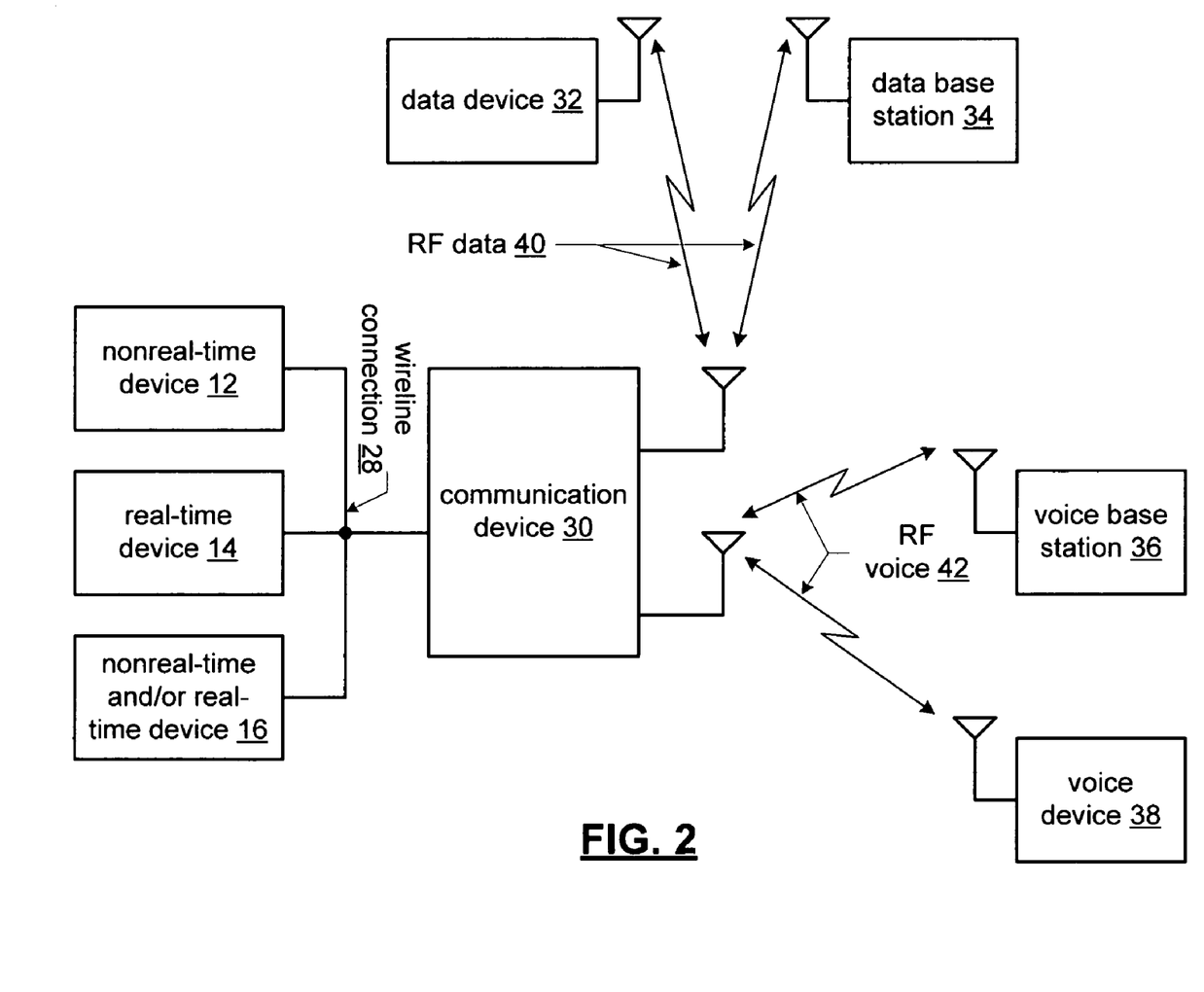
FIG. 2 is a schematic block diagram of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
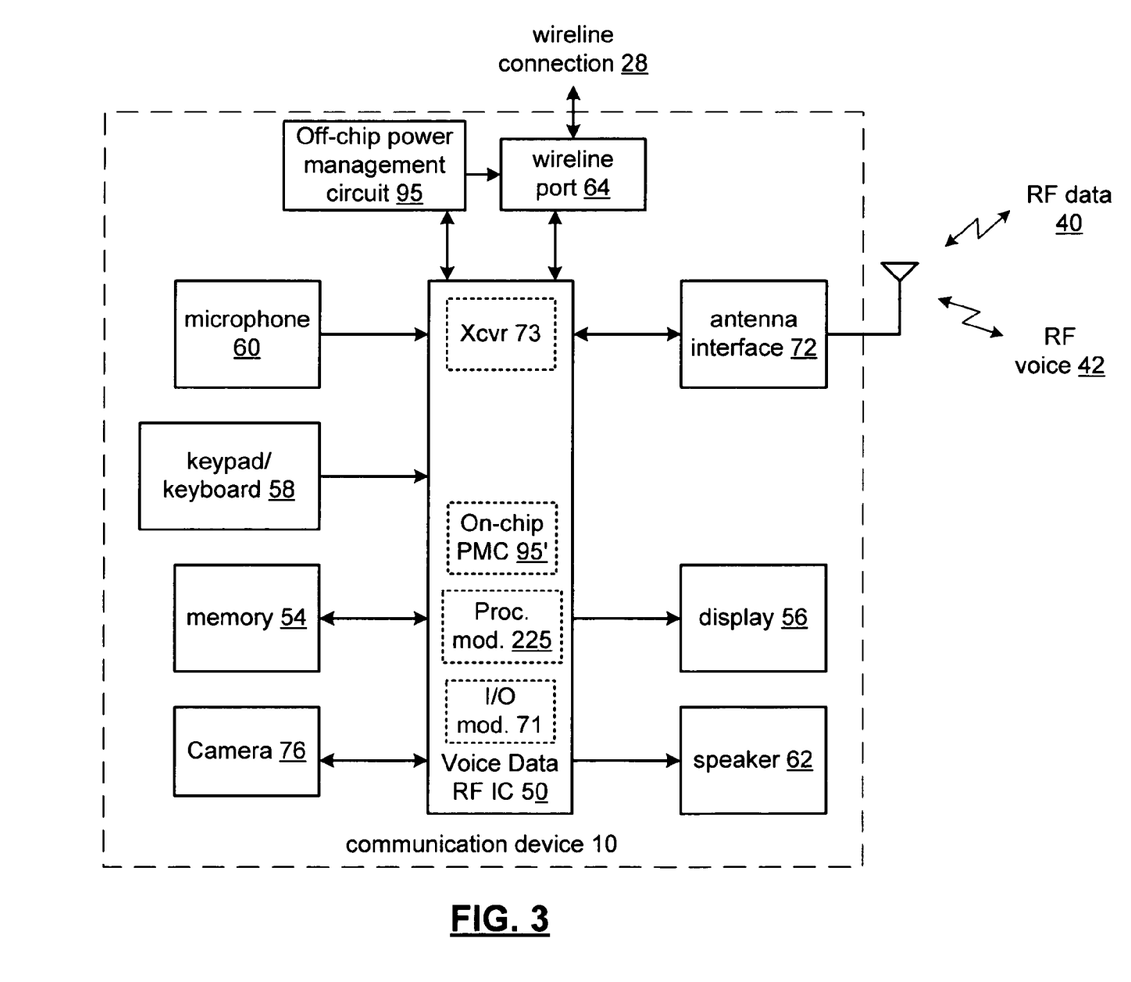
FIG. 3 is a schematic block diagram of a wireless communication device 10 in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data into RF real-time data 26 and non-real-time data 24 and transmitting this data via an antenna interface 72 and antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the Voice Data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes an RF transmitter in accordance with the present invention, as will be discussed in greater detail in association with the description that follows, and particularly in conjunction with FIGS. 5-11.

Figure 4:
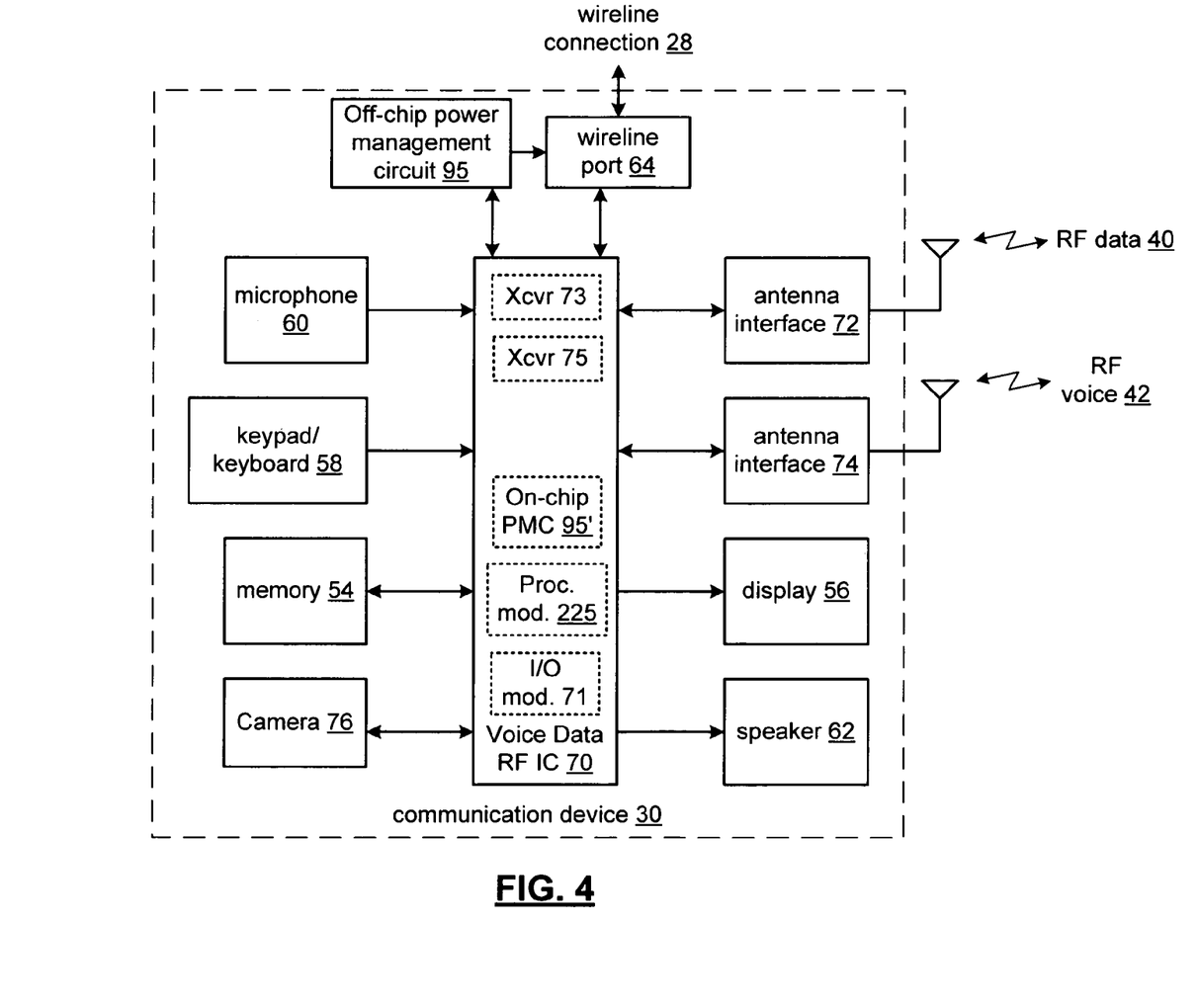
FIG. 4 is a schematic block diagram of a wireless communication device 30 in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes two RF transmitters corresponding to transceivers 73 and 75 in accordance with the present invention, as will be discussed in greater detail in association with the description that follows, and particularly in conjunction with FIGS. 5-11.

Figure 5:
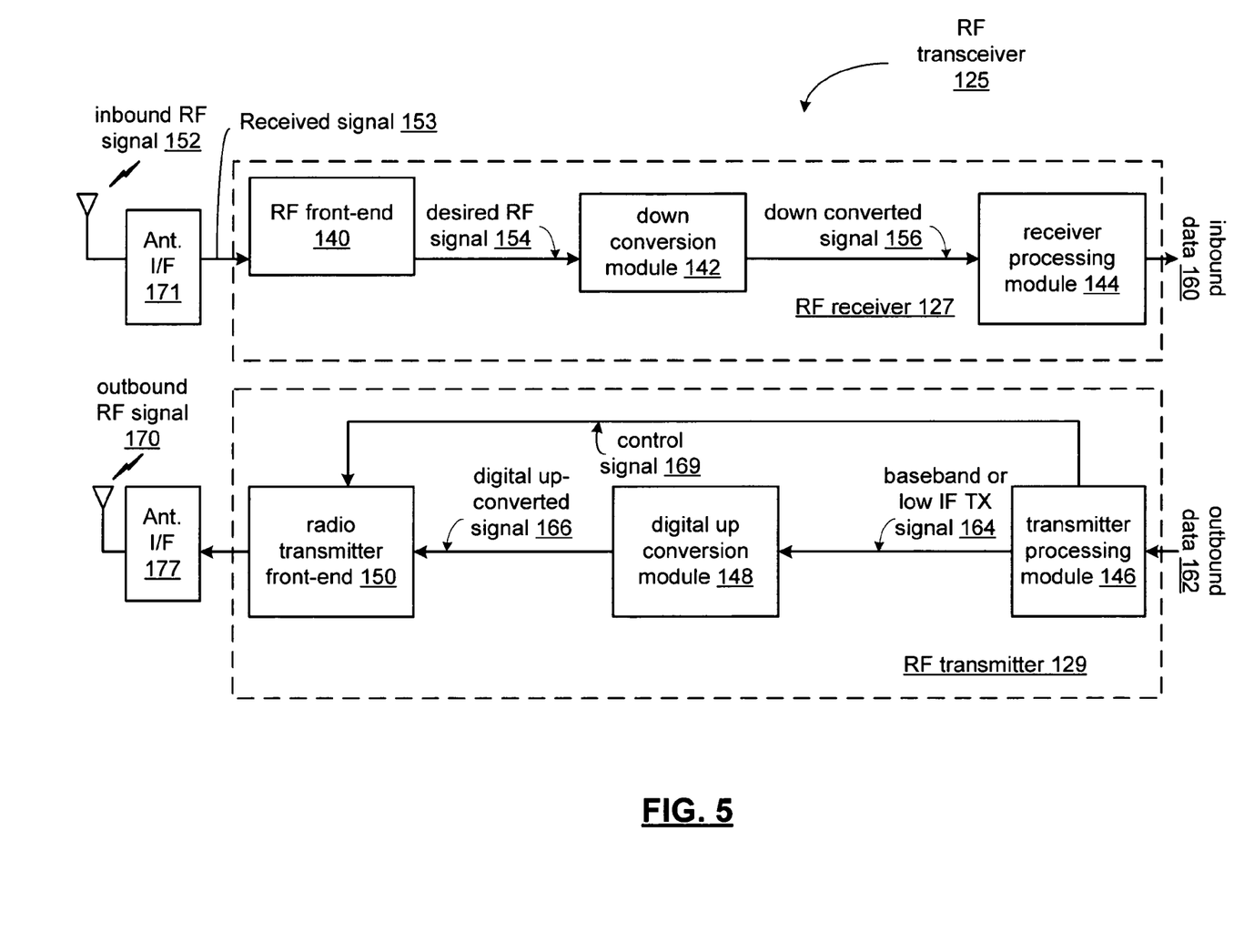
FIG. 5 is a schematic block diagram of an RF transceiver 125 in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129, and an RF receiver 127. The RF receiver 127 includes a RF front end 140, a down conversion module 142 and a receiver processing module 144. The RF transmitter 129 includes a transmitter processing module 146, a digital up conversion module 148, and a radio transmitter front-end 150.

As shown, the receiver and transmitter are each coupled to respective antennas through off-chip antenna interfaces 171 and 177 to produce outbound RF signal 170 and couples inbound signal 152 to produce received signal 153. While each antenna is represented as a single antenna element, the receiver and transmitter may each employ multiple antennas such as a phased array or other multi-antenna configuration, or share a multiple antenna structure that includes two or more antennas. In another embodiment, the receiver and transmitter may share a multiple input multiple output (MIMO) antenna structure that includes a plurality of antennas. Each of these antennas may be fixed, programmable, an antenna array or other antenna configuration. Also, the antenna structure of the wireless transceiver may depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a selected wireless communication protocol (e.g., IEEE 802.11 or other wireless local area network (WLAN) protocol, Bluetooth, RFID, GSM, GPRS, EDGE, CDMA, et cetera) to produce processed data such as baseband or low intermediate frequency (IF) transmit (TX) signals 164 and generates a control signal 169 that indicates the selected one of the plurality of protocols. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The digital up conversion module 148 performs digital processing of the processed data, such as by filtering, and mixing to produce a digital up-converted signal from the processed data. The mixing and filtering converts the digital baseband or low IF signals into digital up converted signals 166 based on a transmitter local oscillation. In an embodiment of the present invention, the digital up conversion module 148 includes a digiRF interface for producing the digital up-converted signal 166 from the processed data. In this fashion, the digital up conversion module 148 operates in the digital signal domain and avoids the use of a digital to analog converter.

The radio transmitter front end 150 includes a power amplifier and may also include a transmit filter module. The power amplifier amplifies the digital up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass or notch filtration. Radio transmitter front end 150 produces a transmit signal from the digital up-converted signal in accordance with the selected one of the plurality of protocols such as GSM, EDGE, CDMS, WLAN, GPRS, 3G, 4G, Wimax, UWB, etc., based on the control signal 169.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 6:
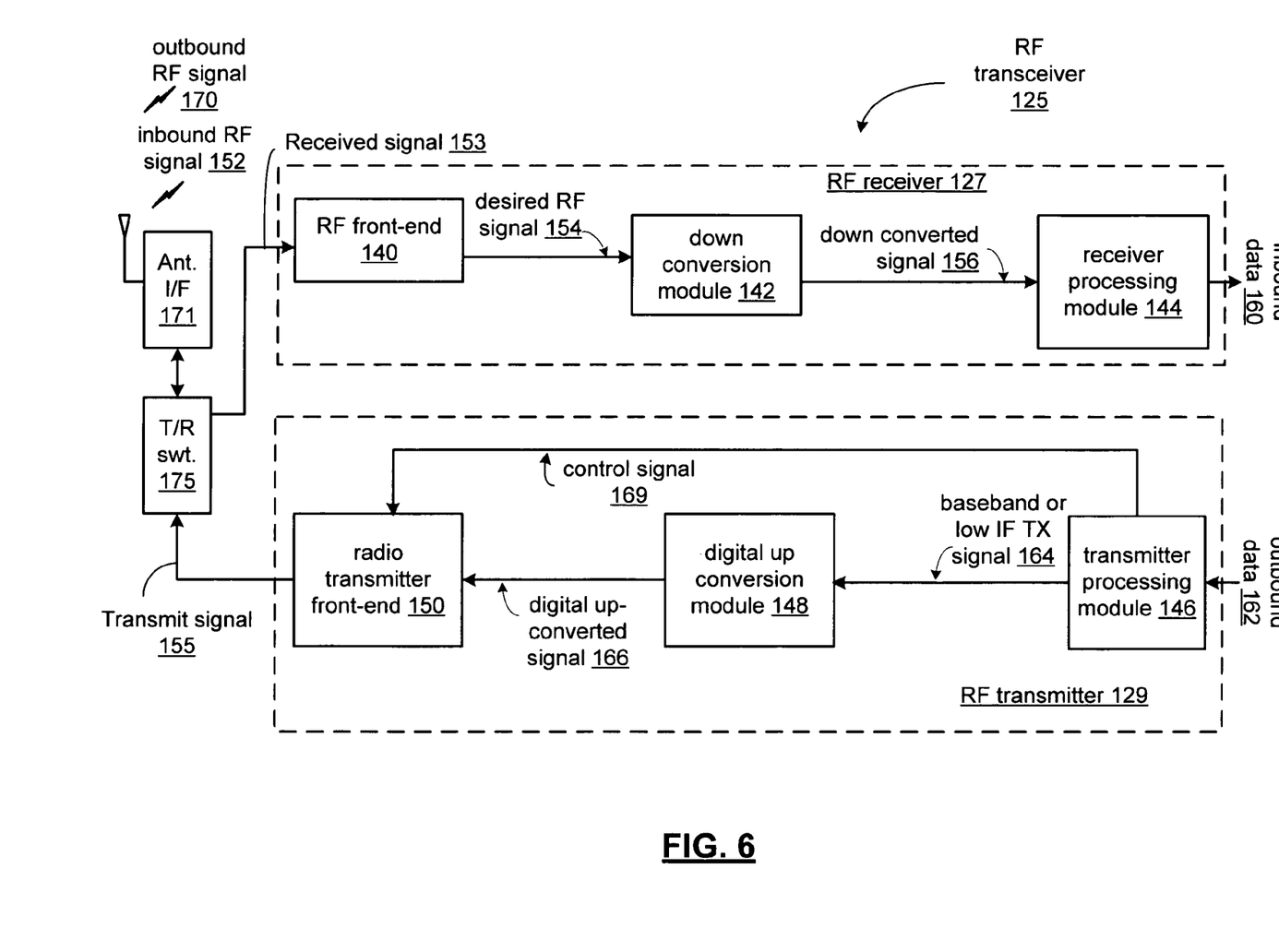
FIG. 6 is a schematic block diagram of an RF transceiver 125 in accordance with a further embodiment of the present invention.

FIG. 6 is a schematic block diagram of an RF transceiver 125 in accordance with a further embodiment of the present invention. This embodiment is similar to the embodiment presented in conjunction with FIG. 5 with similar elements being referred to by common reference numerals. In this embodiment however, RF receiver 127 and RF transmitter 129 share a single antenna and antenna interface 171. As shown, the receiver and transmitter are each coupled to an antenna through an off-chip antenna interface 171 and a transmit/receive switch 175, that couples the transmit signal 155 to the antenna to produce outbound RF signal 170 and couples inbound signal 152 to produce received signal 153. While not shown a diplexer/duplexer can similarly be employed for a similar purpose.

Figure 7:
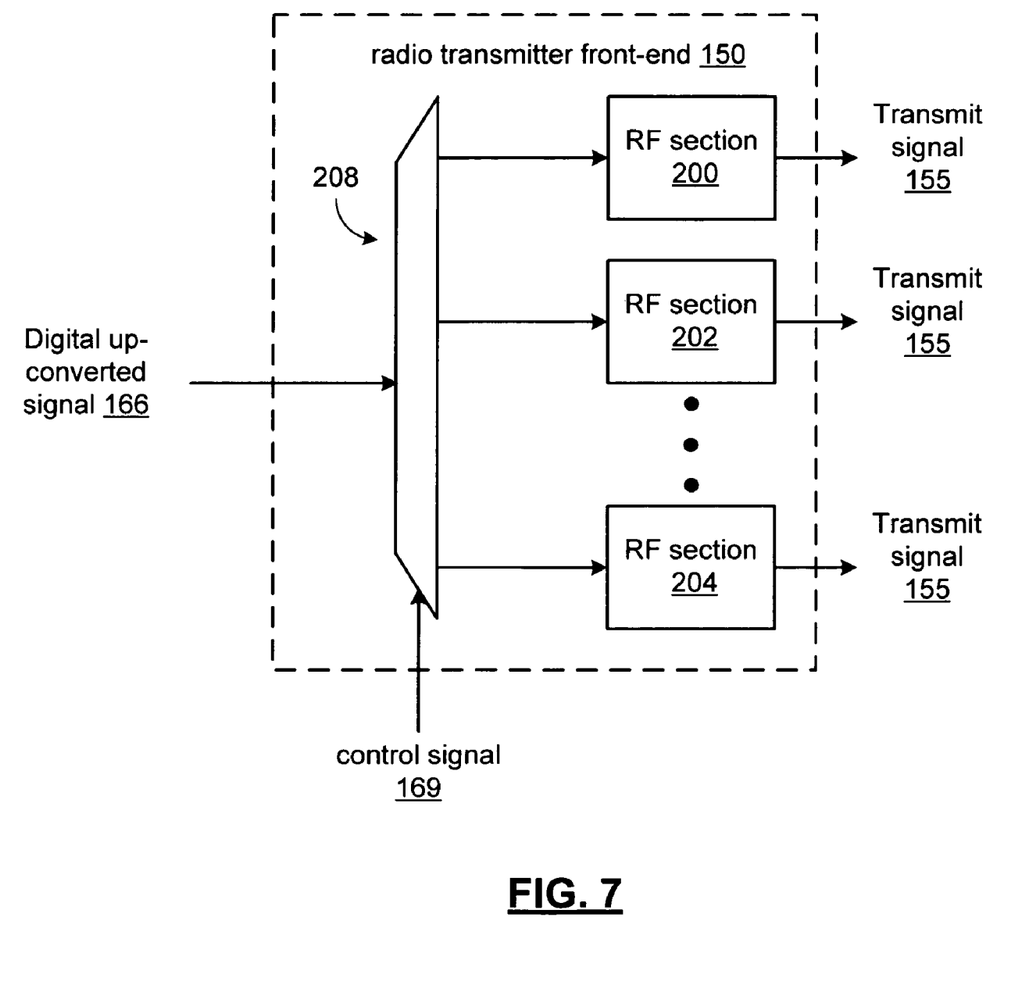
FIG. 7 is a schematic block diagram of a radio transmitter front-end 150 in accordance with an embodiment of the present invention.

FIG. 7 is a schematic block diagram of a radio transmitter front-end 150 in accordance with an embodiment of the present invention. In particular, radio transmitter front-end includes a plurality of RF sections 200, 202, 204, etc. that each operate in accordance with one of the plurality of protocols, such as GSM, GPRS, EDGE, WLAN, CDMA, 3G, 4G, Wimax, UWB, etc. Demultiplexer 208 operates in response to the control signal 169 to couple the digital up-converted signal 166 to a selected RF section (200, 202 or 204, etc.) of the plurality of RF sections, that corresponds to the protocol currently used in the transmitter processing module 146, to produce the transmit signal 155 that is coupled to an antenna interface such as antenna interface 177, a transmit receive switch such as transmit receive switch 175, or a diplexer/duplexer, or directly to a dedicated antenna for each of the RF sections 200, 202, 204, etc.

Figure 8:
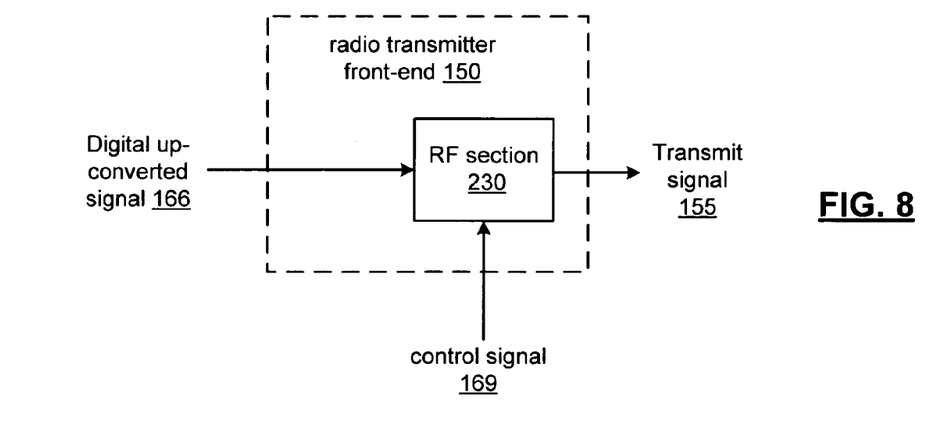
FIG. 8 is a schematic block diagram of a radio transmitter front-end 150 in accordance with a further embodiment of the present invention.

FIG. 8 is a schematic block diagram of a radio transmitter front-end 150 in accordance with a further embodiment of the present invention. In contrast to the embodiment of FIG. 7, a single RF section 230 is programmable based on the control signal 169 to operate in a plurality of modes corresponding to the plurality of protocols and to produce the corresponding transmit signal 155 from the digital up-converted signal 166.

Figure 9:
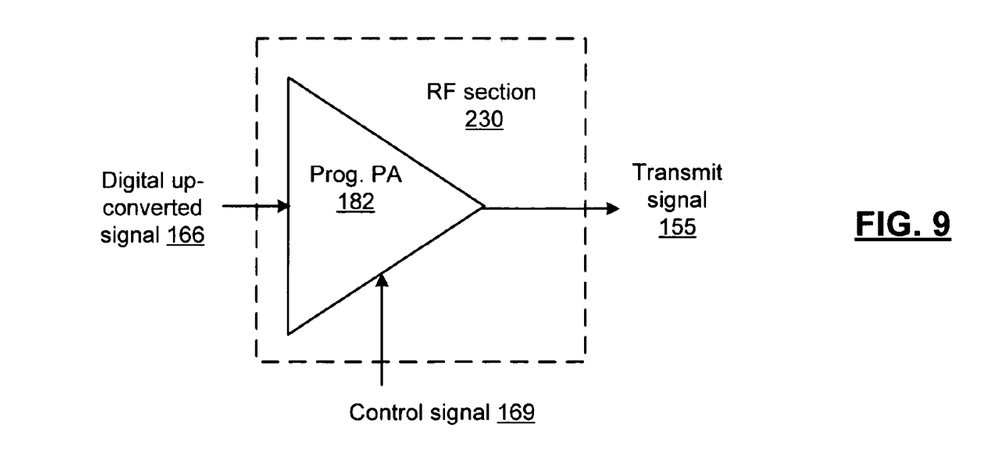
FIG. 9 is a schematic block diagram of an RF section 230 in accordance with an embodiment of the present invention.

FIG. 9 is a schematic block diagram of an RF section 230 in accordance with an embodiment of the present invention. In particular, RF section 230 includes a programmable power amplifier 182 that operates directly on the digital up-converted signal 166 to produce transmit signal 155 in accordance with the selected one of the plurality of protocols (GSM, EDGE, GPRS, CDMA, WLAN, 3G, 4G, Wimax, etc.), based on the control signal 169. In an embodiment of the present invention, the programmable power amplifier 182 includes a controller that controls the biasing, gain, bandwidth, impedance, or other RF parameters or other parameter(s) of the programmable power amplifier 182 in response to the control signal 169. Such a controller can be may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the controller implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In an embodiment of the present invention, the controller includes a look-up table that produces one or more command signals to control the parameters of the programmable power amplifier 182 in response to the particular protocol that is selected, as indicated by the control signal 169.

Figure 10:
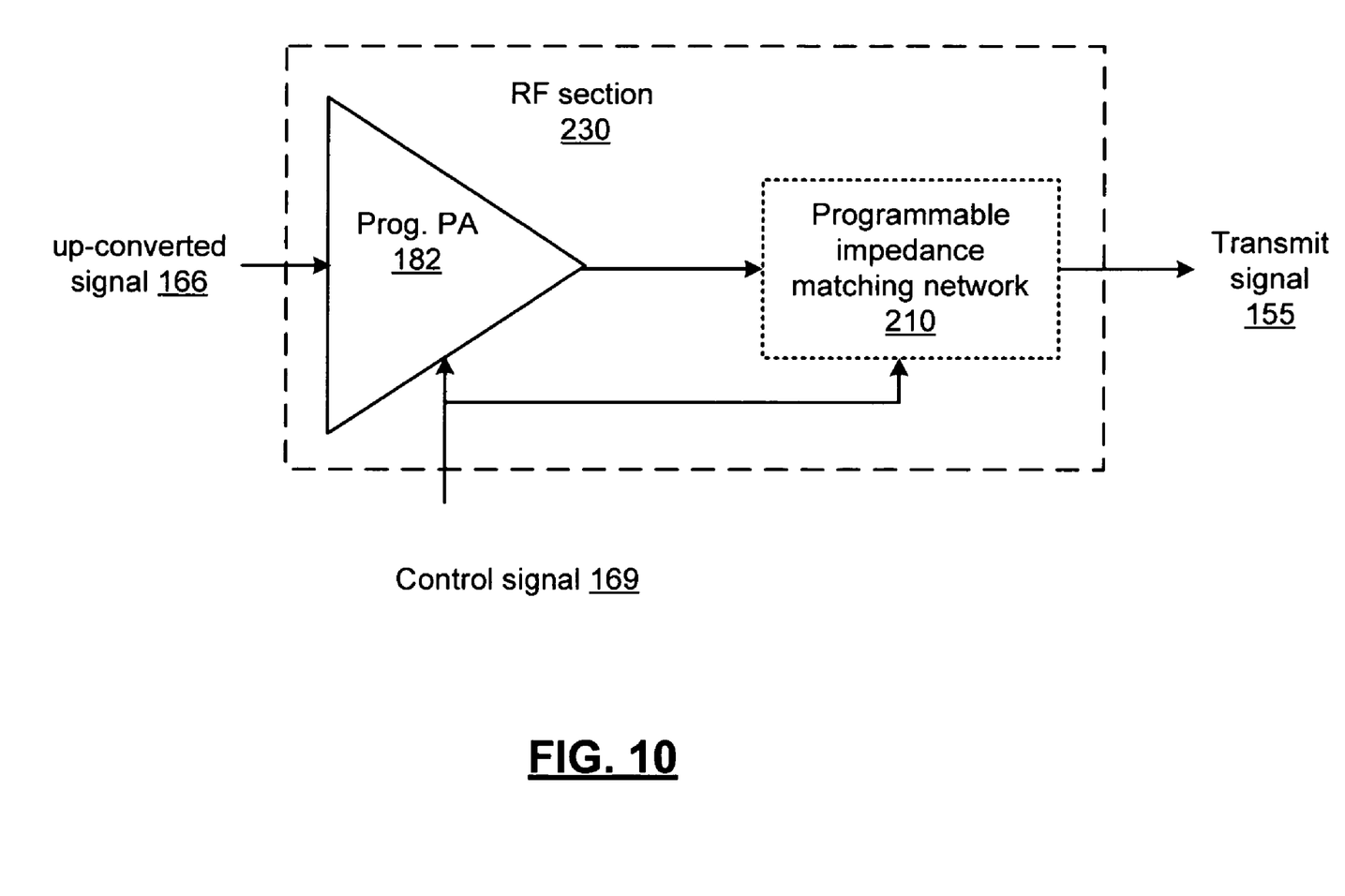
FIG. 10 is a schematic block diagram of an RF section 230 in accordance with a further embodiment of the present invention.

FIG. 10 is a schematic block diagram of an RF section 230 in accordance with a further embodiment of the present invention. In particular, RF section 230 includes common elements from the embodiment shown in conjunction with FIG. 9 that are referred to by common reference numerals. In addition, the RF section 230 includes a programmable impedance matching network 210 that provides impedance matching for the programmable power amplifier 182 in response to the control signal 169. As the characteristics of the programmable power amplifier 182 are modified to conform with a particular selected protocol, the programmable impedance matching network can similarly be modified.

In an embodiment of the present invention, the programmable impedance matching network is implemented with on-chip components such as a plurality of fixed impedances such as inductors, transformers, resistors, capacitors that are selectable via a switching network and optionally controller to produce desired impedances and desired impedance matching under command of the control signal 169. Such a controller can be may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the controller implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

While shown and described above as an on-chip programmable impedance matching network, one or more components of the programmable impedance matching network can be implemented with off-chip components, particularly inductors or transformers but with capacitors and/or resistors as well. Further, the programmable impedance matching network can be implemented entirely within antenna interfaces 171 and/or 177.

Figure 11:
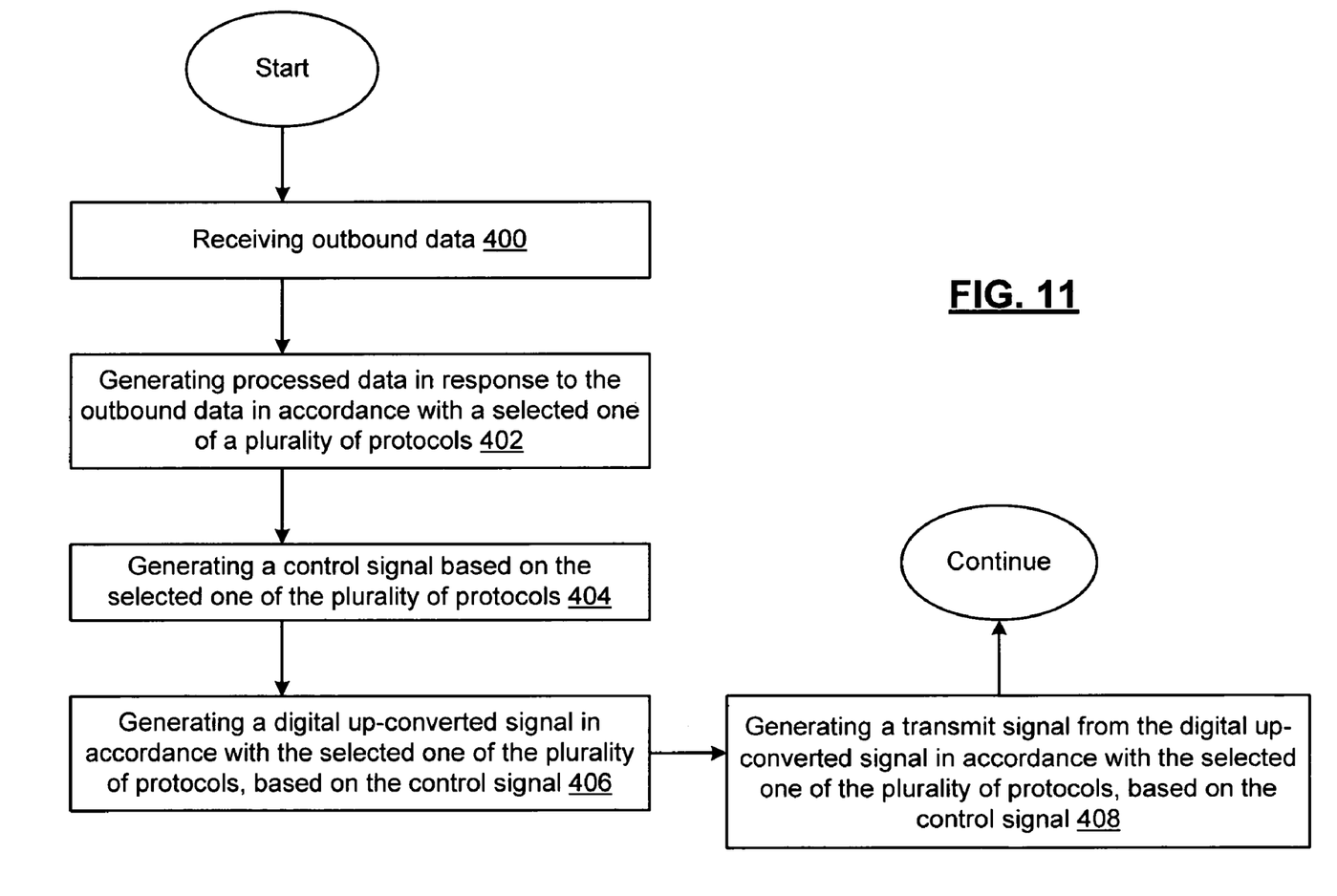
FIG. 11 is a flowchart representation of a method in accordance with an embodiment of the present invention.

FIG. 11 is a flowchart representation of a method in accordance with an embodiment of the present invention. In particular a method is presented for use with one or more features or functions presented in conjunction with FIGS. 1-10. In step 400, outbound data is received. In step 402, processed data is generated in response to the outbound data in accordance with a selected one of a plurality of protocols. In step 404, a control signal is generated based on the selected one of the plurality of protocols. In step 406, a digital up-converted signal is generated from the processed data. In step 408, a transmit signal is generated from the digital up-converted signal in accordance with the selected one of the plurality of protocols, based on the control signal.

In an embodiment of the present invention, step 406 includes using a digiRF interface. Further, step 408 can include processing the digital up-converted signal by a selected one of a plurality of a plurality of RF sections that each operate in accordance with one of the plurality of protocols. The plurality of protocols can include a global system for mobile communications protocol, a general packet radio service protocol, an enhanced data rates for global evolution protocol, a wireless local area network protocol, and/or a code division multiple access protocol, a Wimax protocol, a third or fourth generation wireless protocol, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice, data and RF integrated circuit (IC) comprising:
   a transmitter processing module, coupled to receive outbound data and to produce processed data in accordance with a selected one of a plurality of protocols and that generates a control signal based on the selected one of the plurality of protocols;
   a digital up conversion module, coupled to the transmitter processing module, that operates without a digital to analog converter to produce a digital up-converted radio frequency (RF) signal from the processed data; and
   a radio transmitter front end, coupled to the digital up conversion module, that includes a programmable power amplifier that produces a transmit signal by amplifying the digital up-converted RF signal in accordance with the selected one of the plurality of protocols, based on the control signal.

2. The voice, data and RF IC of claim 1 wherein the digital up conversion module includes a digiRF interface.

3. The voice, data and RF IC of claim 1 wherein the radio transmitter front-end further includes a programmable impedance matching network that provides impedance matching for the programmable power amplifier in response to the control signal.

4. The voice, data and RF IC of claim 1 wherein the plurality of protocols includes a global system for mobile communications protocol.

5. The voice, data and RF IC of claim 1 wherein the plurality of protocols includes a general packet radio service protocol.

6. The voice, data and RF IC of claim 1 wherein the plurality of protocols includes an enhanced data rates for global evolution protocol.

7. The voice, data and RF IC of claim 1 wherein the plurality of protocols includes a wireless local area network protocol.

8. The voice, data and RF IC of claim 1 wherein the plurality of protocols includes a code division multiple access protocol.

9. The voice, data and RF IC of claim 1 wherein the plurality of protocols includes a fourth generation wireless protocol.

10. The voice, data and RF IC of claim 1 wherein the plurality of protocols includes a wimax protocol.

11. A radio frequency (RF) transmitter comprising:
    a transmitter processing module, coupled to receive outbound data and to produce processed data in accordance with a selected one of a plurality of protocols and that generates a control signal based on the selected one of the plurality of protocols;
    a digital up conversion module, coupled to the transmitter processing module, that operates without a digital to analog converter to produce a digital up-converted radio frequency (RF) signal from the processed data, wherein the digital up conversion module includes a digiRF interface; and
    a radio transmitter front end, coupled to the digital up conversion module, that includes a programmable power amplifier that produces a transmit signal by amplifying the digital up-converted RF signal in accordance with the selected one of the plurality of protocols, based on the control signal.

12. The RF transmitter of claim 11 further comprising:
    a programmable impedance matching network that provides impedance matching for the programmable power amplifier in response to the control signal.

13. The RF transmitter of claim 11 wherein the plurality of protocols includes a global system for mobile communications protocol.

14. The RF transmitter of claim 11 wherein the plurality of protocols includes a general packet radio service protocol.

15. The RF transmitter of claim 11 wherein the plurality of protocols includes an enhanced data rates for global evolution protocol.

16. The RF transmitter of claim 11 wherein the plurality of protocols includes a wireless local area network protocol.

17. The RF transmitter of claim 11 wherein the plurality of protocols includes a
    code division multiple access protocol.

18. The RF transmitter of claim 11 wherein the plurality of protocols includes a fourth generation wireless protocol.

19. The RF transmitter of claim 11 wherein the plurality of protocols includes a wimax protocol.

* * * * *